United States Patent [19]

Ziegler

[11] 4,366,404

[45] Dec. 28, 1982

[54] BRUSH ASSEMBLY FOR DYNAMOELECTRIC MACHINES

[75] Inventor: Herwin G. Ziegler, Nussbaumen, Switzerland

[73] Assignee: BBC, Brown, Boveri & Company, Limited, Baden, Switzerland

[21] Appl. No.: 242,290

[22] Filed: Mar. 10, 1981

[30] Foreign Application Priority Data

Mar. 21, 1980 [EP] European Pat. Off. ........... 80200257

[51] Int. Cl.[3] ............................................ H02K 13/00

[52] U.S. Cl. .................................... 310/239; 310/242; 310/245

[58] Field of Search ............... 310/238, 239, 240, 242, 310/248, 249, 245

[56] References Cited

U.S. PATENT DOCUMENTS

| | | | |
|---|---|---|---|
| 3,127,533 | 3/1964 | Gardner | 310/239 |
| 3,387,155 | 6/1968 | Krulls | 310/239 |
| 3,423,618 | 1/1969 | Schmid et al. | 310/242 |
| 3,968,391 | 7/1976 | Blank | 310/240 |
| 4,082,975 | 4/1978 | Azarov et al. | 310/239 |
| 4,095,131 | 6/1978 | Febonio | 310/239 |
| 4,296,346 | 10/1981 | Ooki et al. | 310/240 |

*Primary Examiner*—J. D. Miller
*Assistant Examiner*—D. L. Rebsch
*Attorney, Agent, or Firm*—Oblon, Fisher, Spivak, McClelland & Maier

[57] ABSTRACT

A brush assembly for electrical machines provided for the transfer of current from a stationary brush holder to a rotating contact part, wherein the stationary supporting structure includes a brush bar (brush magazine) having integrally formed stationary brush boxes in which a brush subassembly having at least one brush carrier element can be slidably mounted. The brushes mounted in the brush carrier element are slidably movable in a direction towards the rotating contact part, and are biased thereagainst by means of a spring, also carried by the brush carrier element. The sub-assembly, including the brush, brush carrier element, and spring, slides into the brush boxes and can be locked in position while being simultaneously electrically connected with the brush boxes. Accordingly, only a brush to be inspected and/or replaced, together with a few additional components, need be separated from the brush holder, while the component which determines the rigidity of the brush assembly is left in rigid connection within the electrical machine during maintenance of the assembly.

16 Claims, 8 Drawing Figures

BRUSH ASSEMBLY FOR DYNAMOELECTRIC MACHINES

BACKGROUND OF THE INVENTION

1. Field of the Invention

This invention relates to a brush assembly used in dynamoelectric machines for the transfer of current from a stationary brush magazine to a rotating contact part with stationary brush boxes, which mechanically and electrically are connected with the supporting structure, to receive and radically guide the brushes whereby the brushes are removable for control and replacement purposes while the machine is running and under voltage.

2. Description of the Prior Art

A brush assembly of the above noted type is, for example, known from the U.S. Pat. No. 3,387,155.

Uninterrupted operation assumes priority importance with machine units which become bigger and bigger, particularly with turbogenerators and hydrogenerators. If such machines are equipped with brushes, the shutting-down, solely for the purpose of inspecting the brushes or exchanging worn brushes, is undesirable since any shutting-down results in a considerable reduction in production. For this reason, different brush holder arrangements have been created in the recent past which permit exchanging the brushes while the machine is running and under voltage.

In the case of some of these known assemblies, always one brush with a respective supporting brush box and pressure mechanism, which presses the brush against the rotating contact part (slip ring, commutator), is separated from the stationary contact part, from the supporting structure or from the brush gear bars. The electrical connection is also interrupted with the mechanical separation. Plug brush holders of this kind are, for example, described and shown in the U.S. Pat. No. 3,466,481 and in the Swiss Pat. No. 504,797. While with these designs always only individual brushes, together with the supporting brush box or pressure mechanisms, can be exchanged, other known assemblies provide for combining several brushes with their boxes and spring arrangements which are detachable as a unit.

An essential feature of all these designs is that not only the brush, the only part of importance, but also the brush guide elements (brush box), the pressure system (spring) and the fastening means are combined to form a "brush holder plug-in unit" which can be pulled off while the machine is running. An advantage of the plug-in units with several brushes is a considerably faster inspection and a faster exchange of worn carbons which plays an essential role especially in case of machines with up to 100 and more brushes.

In case of high speed dynamoelectric machines, particularly turbogenerators, turboexciters and homopolar generators, an essential requirement of the brush system is that the brush holder box guiding the brush must be designed in a vibration-resistant manner and must be rigidly connected with the resting part of the supporting structure. This requires an extremely rigid construction and a strong fastening mechanism for the known plug-in units, especially for those with several brushes. The plug-in units therefore are necessarily voluminous, heavy and inconvenient in their handling. Additionally, the space they occupy cuts down on the cooling flow cross-sections necessary for the supply of cold air. The space requirement of such plug-in units becomes especially serious for large turbogenerators where the necessary number of brushes can practically not be accommodated on the slip rings limited by other frame conditions.

SUMMARY OF THE INVENTION

Accordingly, the objects of this invention are to provide a novel brush assembly which is distinguished by a small space requirement, high rigidity, and which can be easily handled.

These and other objects are achieved by providing a novel brush assembly, according to the invention, having brush boxes which are an integral component of the stationary supporting structure which form the brush bar (brush magazine) while the brushes are arranged in a movable manner in radial direction on brush carrier elements which are, simultaneously, carriers of the springs to press the brushes against the rotating contact part, wherein the subassembly consisting of the brush(es) and the brush carrier element can slide into the stationary brush boxes, can be locked in its operational position and can be simultaneously connected electrically with the brush boxes through a contact arrangement.

The advantage of the invention lies particularly in the fact that only the component, i.e. the brush, to be inspected and/or exchanged and as few additional components as possible must be separated from the brush gear while those components which essentially determine the rigidity of the entire brush assembly are left in their rigid connection with the machine. Thus, the weight and dimension reduction of the components to be plugged-in and pulled-out while the machine is in operation and under voltage which leads also to an easier and safer handling of these components. Furthermore, the reduced space requirement, in comparison with known designs, is of advantage since the brush magazine can be designed as a rigid box girder. This permits, on the one hand, accommodating a greater number of brushes and, on the other hand, also a targeted guiding of the cooling air.

According to the invention, the brush carrier element has one or several stops interacting with the brush or brushes to limit the radial movement of the brush in the plugged-in operation position, as well as in the pulled-out service position. The brush is then provided with a top fitting which is provided with projections which interact with the stops and also serve to guide the brush outside the plugged-in operating position. Accordingly, the brush in its pulled-out position is placed in such a way that it can be introduced into the brush box(es) together with the brush carrier element, and the stop or guide elements release the brush(es) after having been introduced and lifted-off from the end stop in such a fashion that the brush(es) is no longer guided on the brush carrier element but in the brush box.

In a particularly advantageous implementation, the brush carrier elements are designed in the shape of plates and provided with a respective number of finger-like projections corresponding to the number of brushes, with the finger-like projections reaching into the brush boxes. In this instance, the brush carrier elements are guided in radially running slots in the brush boxes or brush magazine.

According to another aspect of the invention, the brush carrier elements are provided with a catch to stop the sub-assembly comprising the brush(es) and brush carrier element, with this catch interacting with a cam or recess arranged on the outside of the brush box in such a manner that it is safely held in the plugged-in operating position and can only be detached by means of an intended outside intervention. While the electrical connection between brush and brush carrier element is effected (in an actually known manner) by means of flexible connecting lines hereinafter referred to as "flexibles" a plug contact arrangement is provided for the electrical connection between brush carrier element and brush box or brush magazine, whereby one contact part is arranged on the brush carrier element and the other contact part on the brush magazine, preferably designed as one part.

According to yet another feature of the invention, the brushes have head fittings which are provided with one or several projections on the side towards the brush carrier element, with these projections engaging in radially running recesses in the brush carrier element. The maximum radial lift of the brush can, in this instance, be determined by the length of the recess or by a corresponding selection of the length of the flexibles between brush and brush carrier element.

In an alternative design, the brushes are also provided with top fittings provided with projections on the side towards the brush carrier element, with the projections preferably laterally embracing the brush carrier element. In order to limit the radial lift of the brush, either the ends on the contact part side of the brush carrier elements are provided with registering edges which interact with the projections of the top fittings or the length of the flexible connecting lines between brush and brush carrier element determines the maximum radial lift of the brush.

With plate-shaped brush carrier elements, it is advantageous if the springs provided for pressing the brush against the rotating contact part are fastened on the brush carrier element by using therebetween a spring carrier plate wherein the spring carrier plate extends laterally beyond the end of the brush carrier element on the contact part side and is embraced by the projections of the head fittings. This simplifies the machining of the brush carrier elements and permits the use of different brush and/or top fitting types since only the spring carrier plate must be adjusted to the respective conditions.

In the case of another advantageous development according to the invention, lateral recesses are provided in the section on the contact part side having a shorter length than the radial height of the projections of the top fittings. The brush (with the brush carrier element being dismantled) can be introduced or pulled out in an inclined manner through these recesses. A broadening at the end of the spring carrier plate on the contact part side limits the radial lift of the brush during installation, as well as during operation against wear beyond a maximum permissible degree.

For the purpose of the safe handling of the brush carrier element, its end away from the rotating contact part is provided with an insulated handle or is designed as such. The handle is additionally shielded by means of an insulating plate. Also the actuation part for the locking of the brush carrier element is electrically insulated and reaches through the insulating plate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
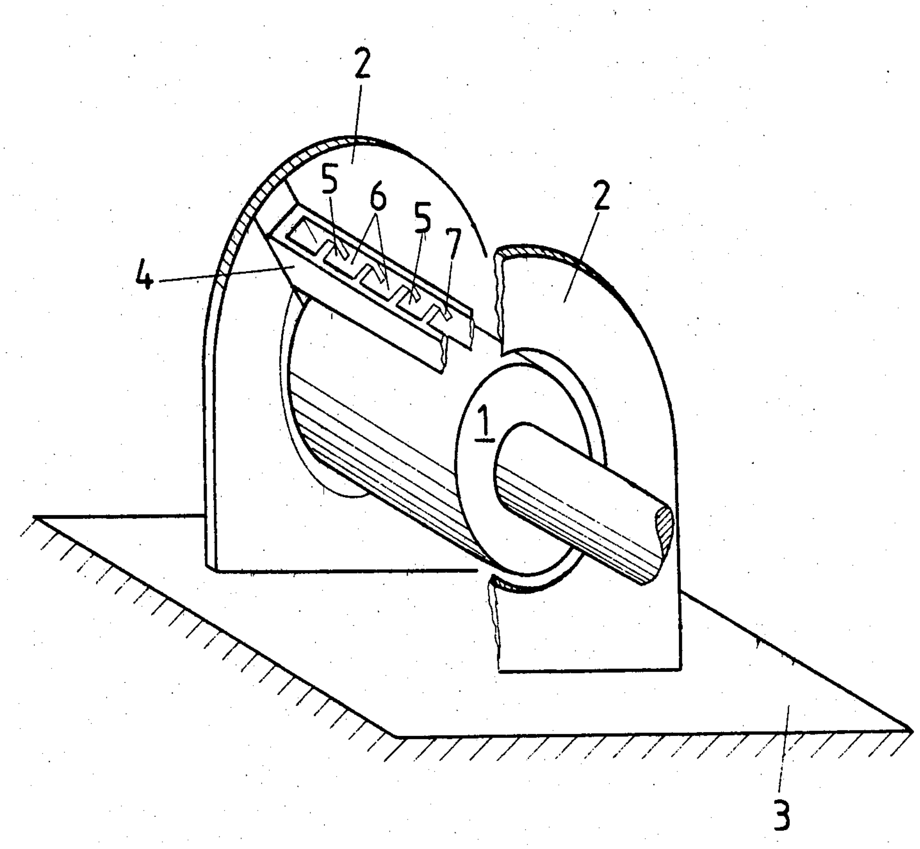
FIG. 1 is a perspective view of a brush assembly for dynamoelectric machines in a highly simplified form.

Referring now to the drawings, wherein like reference numerals designate identical or corresponding parts throughout the several views, and more particularly to FIG. 1 thereof, which is a simplified representation of the slip ring portion of a dynamoelectric machine, the rotating contact part (slip ring or commutator) is designated by 1. The sides 2 of the supporting structure are anchored in an electrically insulated way on a foundation plate 3. Brush magazines 4 are rigidly fastened between the supporting structure sides 2. The brush magazine 4 is designed as a box girder. The axially running side walls are spaced by means of crosspieces 5 so that brush boxes 6 are formed. Each crosspiece 5 has a slot 7, the depth of which corresponds approximately to half of the height of the crosspiece. The edges of the brush boxes pointing towards the outside are rounded off to facilitate the introduction of the brushes, as for example shown in FIG. 4 and labeled 4′ and 5′.

Figure 2:
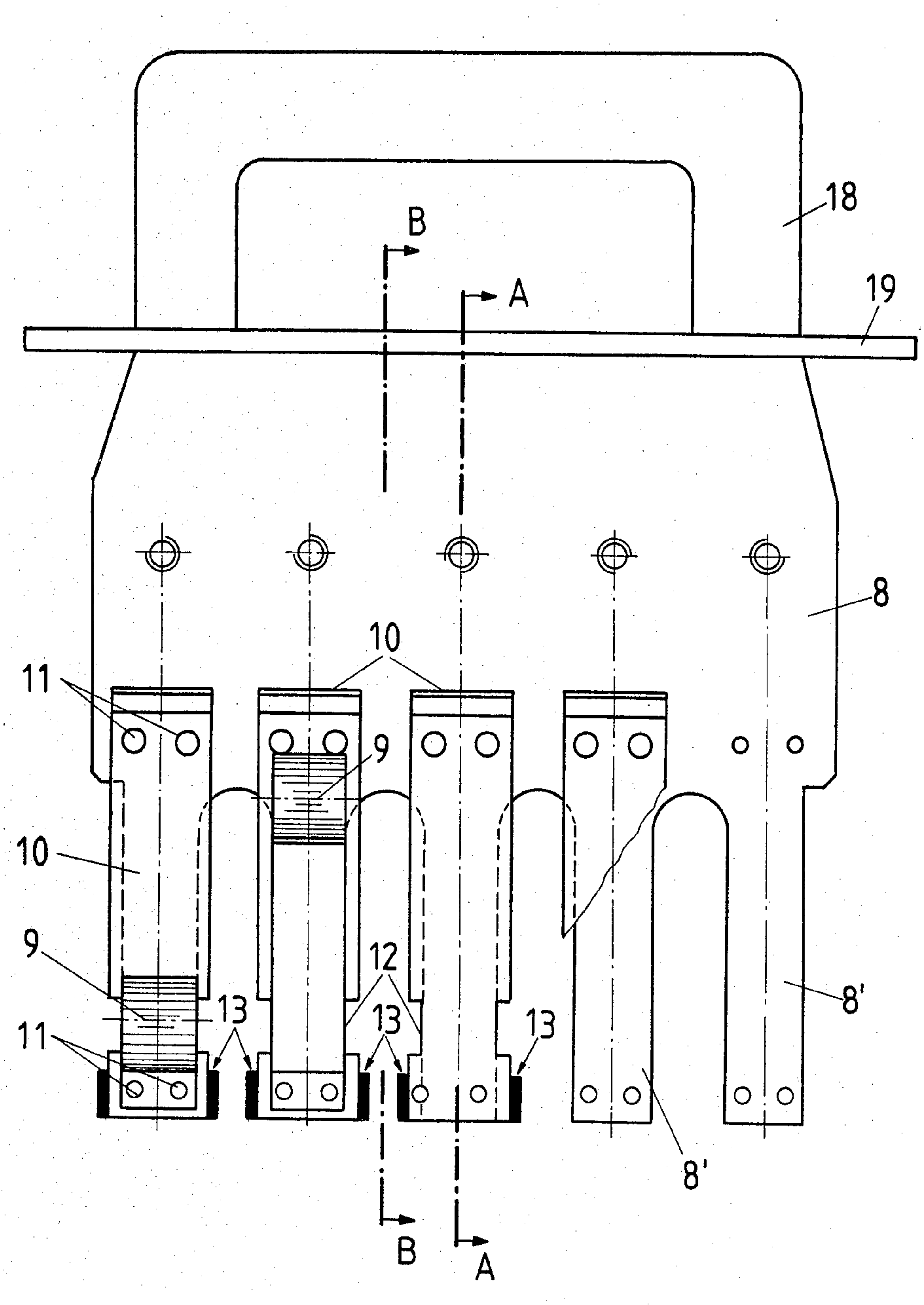
FIG. 2 is a top view of a brush carrier element.
Figure 3:
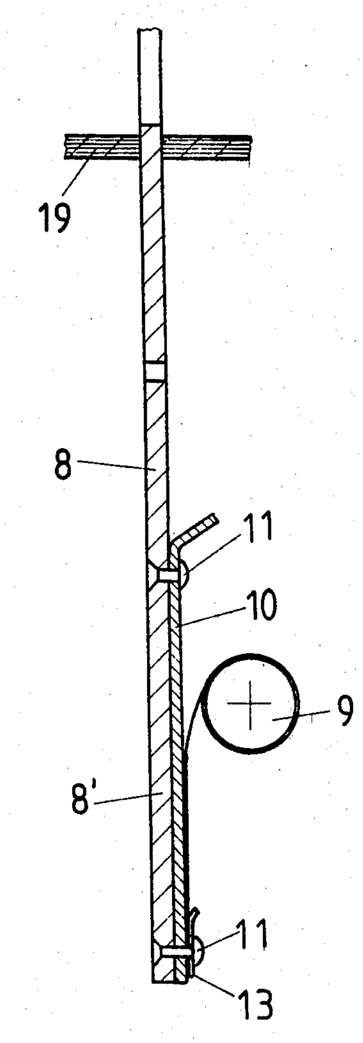
FIG. 3 is a longitudinal cross-sectional view through a brush carrier element according to FIG. 2 along lines A—A.
Figure 6:
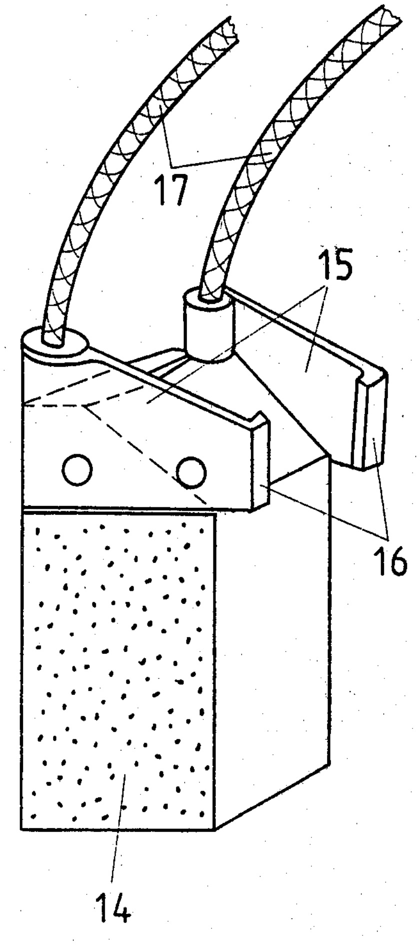
FIG. 6 is a perspective view of a brush with top fitting whereby the top fitting is provided with inwardly bent projections.

FIG. 2 shows a plug-in unit for several brushes. The plug-in unit comprises a plate 8 with several finger-shaped projections 8′ corresponding to the number of brushes. The projections 8′ reach into the brush boxes 6 and rest against the radially extending wall of the brush boxes 6 when viewed from the end of the rotating contact part 1 (slip ring or commutator). Constant force springs 9 are fastened on plate 8 by means of rivets 11 and by placing in between spring carrier elements 10. The spring carrier elements 10 are provided with recesses 12 on both sides at the lower section, i.e. on the contact part side, and the ends of the spring carrier elements 10 are widened by additionally riveting on a small stop plate 13. As can be noticed from the sectional representation of FIG. 4 and from the view according to FIG. 6, each brush 14 has a top fitting 15 of copper sheet which is fastened to the brush 14 in an electrically conductive manner. The top fitting 15 has projections 16 on the side towards the spring carrier element 10 whose ends are bent towards each other. These projections laterally embrace the spring carrier element 10. The width of the projections 16 is larger than the length of the recessions 12. By introducing it in an inclined fashion, the brush can be made to slide on the spring carrier element 10 (and pulled off again). The electrical connection between brush 14 and brush carrier plate 8 is effected by means of stranded brush wire (brush flexibles) 17 which is fastened, on the one hand, on the heat fitting 15 and, on the other hand, on the brush carrier plate 8. The upper end of the brush carrier plate 8 is designed as an insulating handle 18 (FIG. 2). Additionally, the insulation handle 18 is shielded from the remaining brush carrier element by means of an insulating plate 19 which serves, at the same time, as a protection against a contact to the brush flexibles and the brush bars. In this fashion, the safe introduction or removal of the plug-in unit is possible during operation and under voltage.

Figure 4:
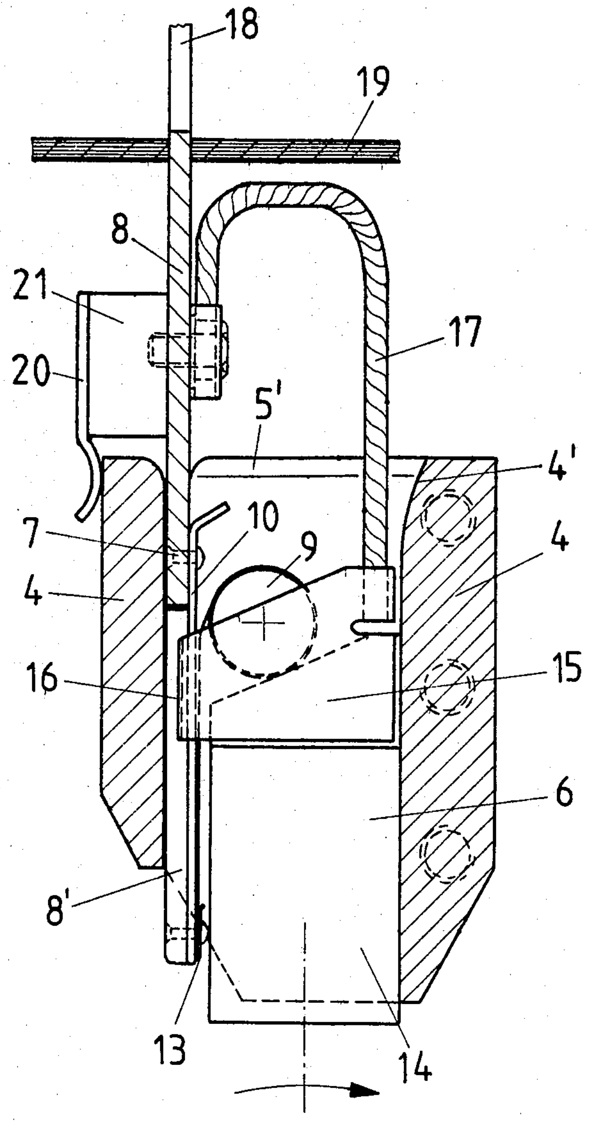
FIG. 4 is a longitudinal cross-sectional view through a brush carrier element according to FIG. 2 along lines B—B.

The electrical connection between the brush carrier element 8 and the brush bar 4 is effected, as shown in FIG. 4, by means of a plug-contact arrangement. One contact part comprises spring contact laminae 20 which is fastened on the brush carrier element 8 by inserting therebetween a conductive spacer 21. The brush bar 4 itself forms the other contact part.

Figure 5:
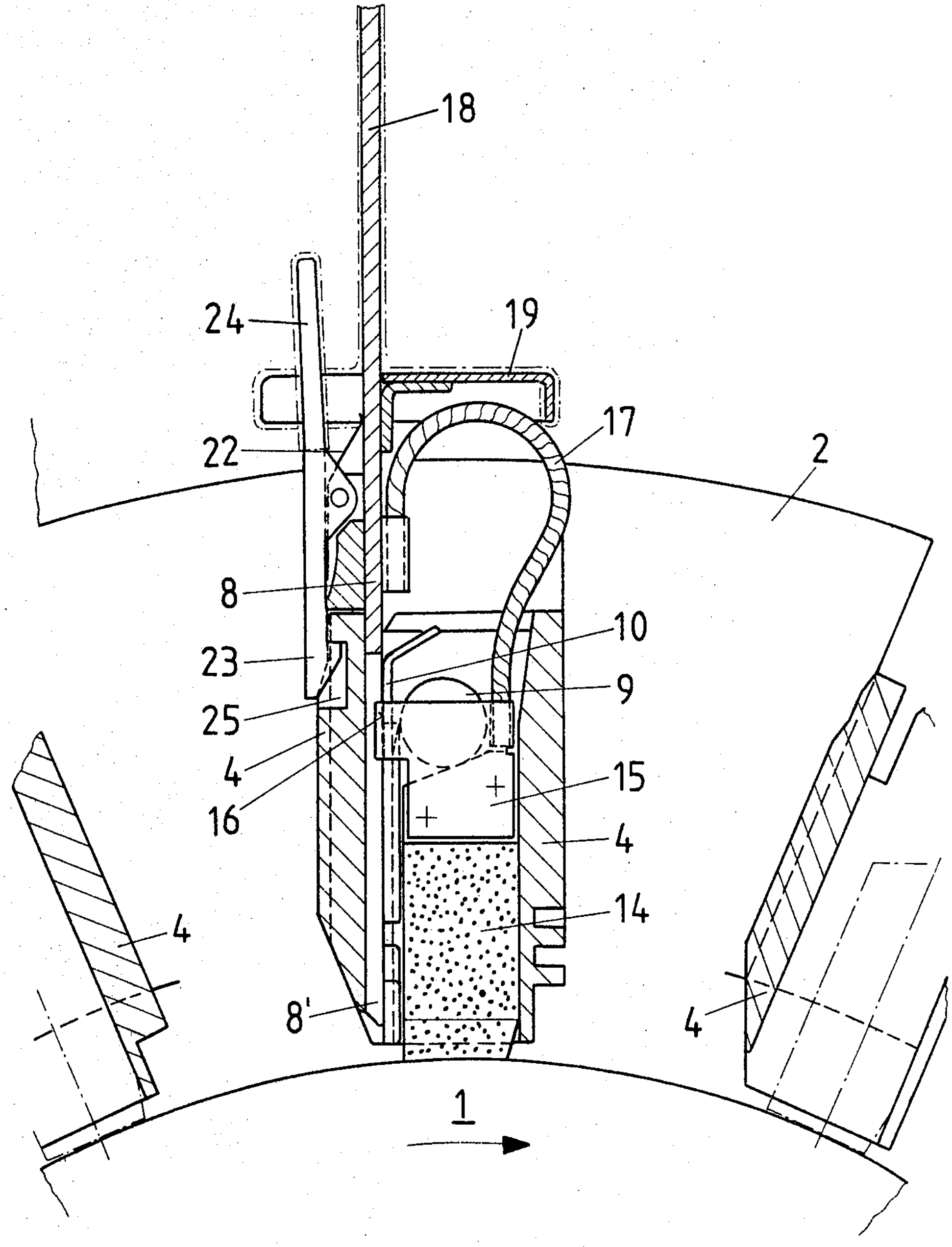
FIG. 5 is a radial cross-sectional view through the brush assembly according to FIG. 1 with an installed brush carrier element.

The mechanical locking of the plug-in unit in the brush holder is effected by means of a catch 23 (FIG. 5) which is supported on the side of the brush carrier element 8 away from the brushes and is initially tensioned by means of a flat spring 22. The catch has an insulated actuation lever 24 which reaches through the insulating plate 19. The catch engages in a recess 25 in the brush bar 4. Two or more locking devices are provided depending on the axial length of the brush carrier elements 8.

The object of the invention is, of course, not limited to the applications as represented in FIGS. 1–6. Thus, the spring carrier elements 10 can, for example, be eliminated and the springs can be directly fastened on the brush carrier element 8.

Figure 7:
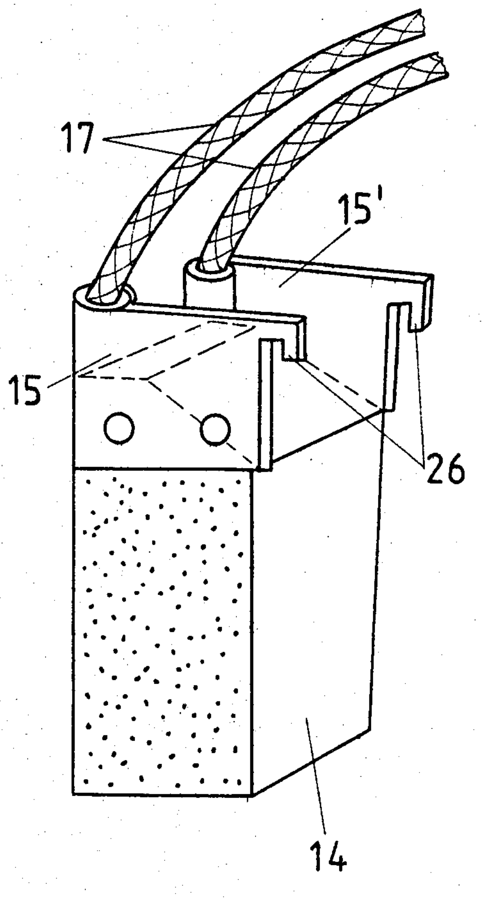
FIG. 7 is a perspective view of an exemplified embodiment of a brush with a top fitting which, arranged in pairs, has hook-like projections pointing towards the rotating contact part.
Figure 8:
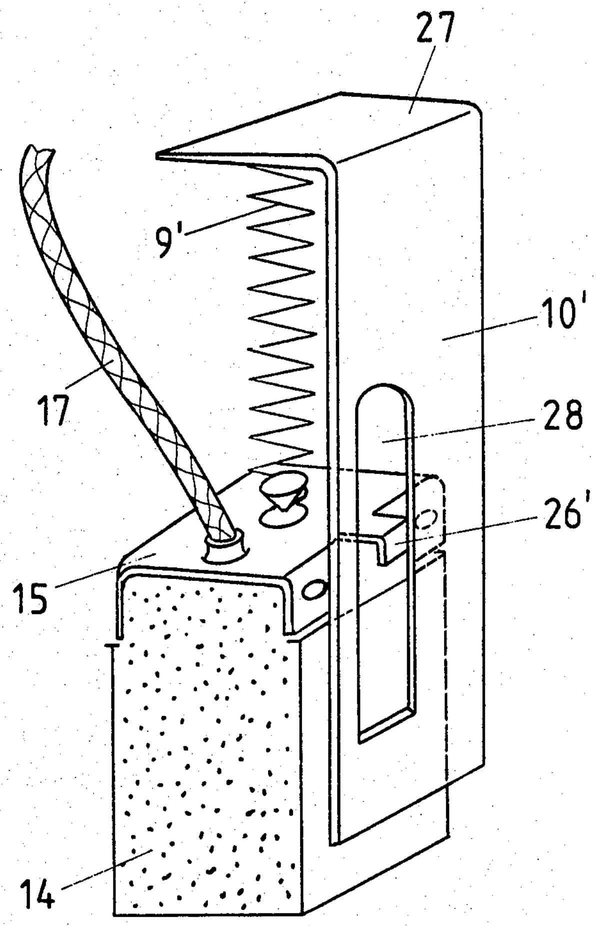
FIG. 8 is a perspective view of an additional exemplified embodiment of a brush whose top fitting has a hook-like projection which is arranged in the center and points towards the rotating contact part.

It is also possible to equip the brushes with other top fittings 15, for example, such as they are shown as exemplified embodiments in FIGS. 7 and 8. Thus, the brush according to FIG. 7 has a top fitting 15' which is provided with hook-like projections 26. The projections are arranged on the side of the brush towards the brush carrier element 8 and point radially inwardly in the direction of the rotating contact part 1. The hook-like projections 26 engage in radially formed slots in the brush carrier element or (if a spring carrier element is used) in the brush carrier element (not shown in the drawing). The length of the slots corresponds, in this case, to the maximum lift of the brush. Additional stopping devices are then unnecessary. A constant force spring can preferably be used to exert the pressure on the brush.

Also in the case of the alternative shown in FIG. 8, a hook-like projection 26' of the top fitting 15'' of the brush 14 engages in a radially formed slot 28 running in the direction of having a length which corresponds to the maximum lift of the brush.

In a modified arrangement in comparison with the designs described so far, the spring provided to press the brush against the rotating contact part is designed as a torsion spring 9' in FIG. 8. On the other hand, it rests on the head fitting 15'' and, on the other hand, on the end 27 of the spring carrier element 10' which is bent towards the inside.

All designs described above have the following characteristics in common:

The connection between brush and brush carrier element is made in such a way that the brush cannot move beyond a final position in a radial direction and this even if it is pulled out. This final position corresponds to the maximum admissible brush wear in the introduced condition.

The brush is positioned on the brush carrier element in such a fashion that the brush can be introduced into the brush pocket without tilting. The introducing of the brushes is further facilitated by the rounded-off edges of the brush pockets. While being introduced, the brush is released at the moment of the contact with the rotating contact part and while lifting from the end stop in such a manner that the brush is no longer guided on the brush carrier element or spring carrier element but in the brush boxes.

Moreover, the handling of the brush plug-in unit is without danger while the machine is running and under voltage. The means for the locking of the plug-in unit during operation and its unlocking for inspection and exchange purposes are simple in their structure. The same applies to the transfer of the current from the brush bar to the brush carrier element.

The object of the invention does not require entirely newly conceived brush and/or top fittings since, in practice, the top fitting of customary brushes must only be slightly modified.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A brush assembly for dynamoelectric machines provided for the transfer of current from a stationary supporting structure to a rotating contact part, said brush assembly provided with brush boxes which are mechanically and electrically connected with the supporting structure to receive and radially guide plural brushes towards the rotating contact part, wherein the brushes are removable for control and replacement purposes from the stationary supporting structure, while the machine is running and under voltage, comprising:

said stationary supporting structure comprising a stationary brush bar having plural integrally formed stationary brush boxes in which respective brushes are to be disposed;

a sub-assembly slidable into said brush boxes and including at least one brush carrier element on which is mounted said plural brushes, and means for rigidly moving said brushes in radial direction toward said rotating contact part, including spring means for biasing said brushes against said rotating contact part;

locking means for locking said sub-assembly in an operating position within said brush boxes; and means for simultaneously making an electrical connection between said stationary brush bar having said integrally formed brush boxes and said brushes upon sliding and locking of said sub-assembly within said brush boxes.

2. A brush assembly according to claim 1, wherein the at least one brush carrier element comprises:

at least one stop interacting with at least one brush to limit the radial movement of the at least one brush in the plugged-in operating position, as well as in the pulled-out service position.

3. A brush assembly according to claim 2, wherein the at least one brush comprises:

a top fitting which is provided with projections, wherein said projections interact with the at least one stop and simultaneously guide the at least one brush outside the plugged-in operating position.

4. A brush assembly according to claim 1, comprising:

said at least one brush carrier element having the shape of a plate and having an end provided with finger-like projections facing the rotating contact part, with the number of projections corresponding to the number of brushes carried by said brush carrier element, wherein said finger-like projections reach into said brush boxes.

5. A brush assembly according to claim 4, wherein said brush bar having said integrally formed brush boxes including slots for guiding the brush carrier elements.

6. A brush assembly according to claim 1, further comprising:

said at least one brush carrier element provided with a catch to stop the sub-assembly, with said catch interacting with a cam or a recess arranged on the outside of the at least one brush box.

7. A brush assembly according to claim 1, further comprising:

a plug contact provided for making electrical connection between the at least one brush carrier element and said brush bar having said integrally formed brush boxes, said plug contact including a contact part arranged on the brush carrier element and another integrally connected contact part arranged on the brush bar having said integrally formed brush boxes.

8. A brush assembly according to claim 1, further comprising:

each brush having top fittings which are provided with plural hook-like projections on a side facing the at least one brush carrier element, said at least one brush carrier element having radially running recesses for engaging said projections.

9. A brush assembly according to claim 8, wherein said radially running recesses have a lower limit which interacts with the projections of the top fittings to serve as a stop for limiting the lift of the brush associated therewith.

10. A brush assembly according to claim 8, further comprising:

a flexible connecting line electrically connecting the brush with the brush carrier element, wherein the length of the flexible connecting lines determines the maximum radial lift of the brush connected thereto.

11. A brush assembly according to claim 7, further comprising:

a top fitting having a side facing the at least one brush carrier element on which side is provided projections for embracing the brush carrier element; and said brush assembly further comprising means for limiting the lift of the at least one brush.

12. A brush assembly according to claim 11, further comprising:

said finger-like projections of said at least one brush carrier element having registration edges which interact with the projections of the top fitting of the at least one brush.

13. A brush assembly according to claims 4, 11 or 12, wherein said spring means provided for pressing the at least one brush against the rotating contact part comprises:

a spring fastened to said brush carrier element by means of a spring carrier element disposed between said spring and said at least one brush carrier element, said spring carrier element extending laterally beyond said at least one brush carrier element and being embraced by the projections of the head fitting attached to said at least one brush.

14. A brush assembly according to claim 13, further comprising:

said spring carrier element provided with a section having a shorter length than the radial height of the projections of said head fitting, and said lateral recesses provided in said section of said spring carrier element;

15. A brush assembly according to claim 6, wherein said at least one brush carrier element comprises at an end thereof opposite the rotating contact part an insulated handle.

16. A brush assembly according to claim 15, further comprising:

an insulating plate shielding said insulated handle; and said catch for stopping said sub-assembly having an actuating part extending through the insulating plate and electrically insulated thereby at an end thereof manually accessable.

* * * * *